(12) United States Patent
Gomez et al.

(10) Patent No.: US 9,470,091 B2
(45) Date of Patent: Oct. 18, 2016

(54) BLADE GROUP ARRANGEMENT AS WELL AS TURBOMACHINE

(71) Applicant: MTU Aero Engines GmbH, Munich (DE)

(72) Inventors: Sergio Elorza Gomez, Munich (DE); Alexander Hergt, Bonn (DE); Ulrich Siller, Bornheim (DE); Tim Schneider, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 679 days.

(21) Appl. No.: 13/760,580

(22) Filed: Feb. 6, 2013

(65) Prior Publication Data

US 2013/0209259 A1 Aug. 15, 2013

(30) Foreign Application Priority Data

Feb. 10, 2012 (EP) .................... 12154944

(51) Int. Cl.
| | |
|---|---|
| *F01D 1/24* | (2006.01) |
| *F01D 5/02* | (2006.01) |
| *F01D 5/14* | (2006.01) |
| *F01D 9/04* | (2006.01) |
| *F04D 29/32* | (2006.01) |
| *F04D 29/54* | (2006.01) |
| *F04D 29/56* | (2006.01) |

(52) U.S. Cl.
CPC .............. *F01D 5/022* (2013.01); *F01D 5/146* (2013.01); *F01D 9/041* (2013.01); *F04D 29/324* (2013.01); *F04D 29/542* (2013.01); *F04D 29/544* (2013.01); *F04D 29/563* (2013.01); *F05D 2240/301* (2013.01); *Y02T 50/673* (2013.01)

(58) Field of Classification Search
CPC ............ F01D 1/10; F01D 5/146; F01D 9/04; F01D 9/041; F05D 2240/129; F05D 2250/34; F05D 2250/37
USPC .......................... 416/200 A, 198 A; 415/193
See application file for complete search history.

(56) References Cited

U.S. PATENT DOCUMENTS

| | | | |
|---|---|---|---|
| 3,195,807 A | 7/1965 | Sheets | |
| 2011/0318172 A1 | 12/2011 | Hoeger | |
| 2012/0148396 A1* | 6/2012 | Guemmer | ................. 415/208.2 |

FOREIGN PATENT DOCUMENTS

| | | |
|---|---|---|
| DE | 390486 | 2/1924 |
| DE | 102008040698 | 1/2010 |
| DE | 10 2009 013 399 | 9/2010 |
| EP | 0 823 540 | 2/1998 |
| EP | 2351920 | 8/2011 |
| WO | WO 2008060195 | 5/2008 |

* cited by examiner

*Primary Examiner* — Dwayne J White
*Assistant Examiner* — Jason Mikus
(74) *Attorney, Agent, or Firm* — Davidson, Davidson & Kappel, LLC

(57) ABSTRACT

A blade group arrangement for a turbomachine in order to form a blade-row group, whereby a front blade and a rear blade each form an overlapping area that has a contraction ratio of at least 1.2, and it also relates to a turbomachine having such a contraction ratio between a front blade and a rear blade.

7 Claims, 5 Drawing Sheets

BLADE GROUP ARRANGEMENT AS WELL AS TURBOMACHINE

This claims the benefit of European Patent Application EP 12154944.8, filed Feb. 10, 2012 and hereby incorporated by reference herein.

The invention relates to a blade group arrangement as well as to a turbomachine.

BACKGROUND

Figure 1:
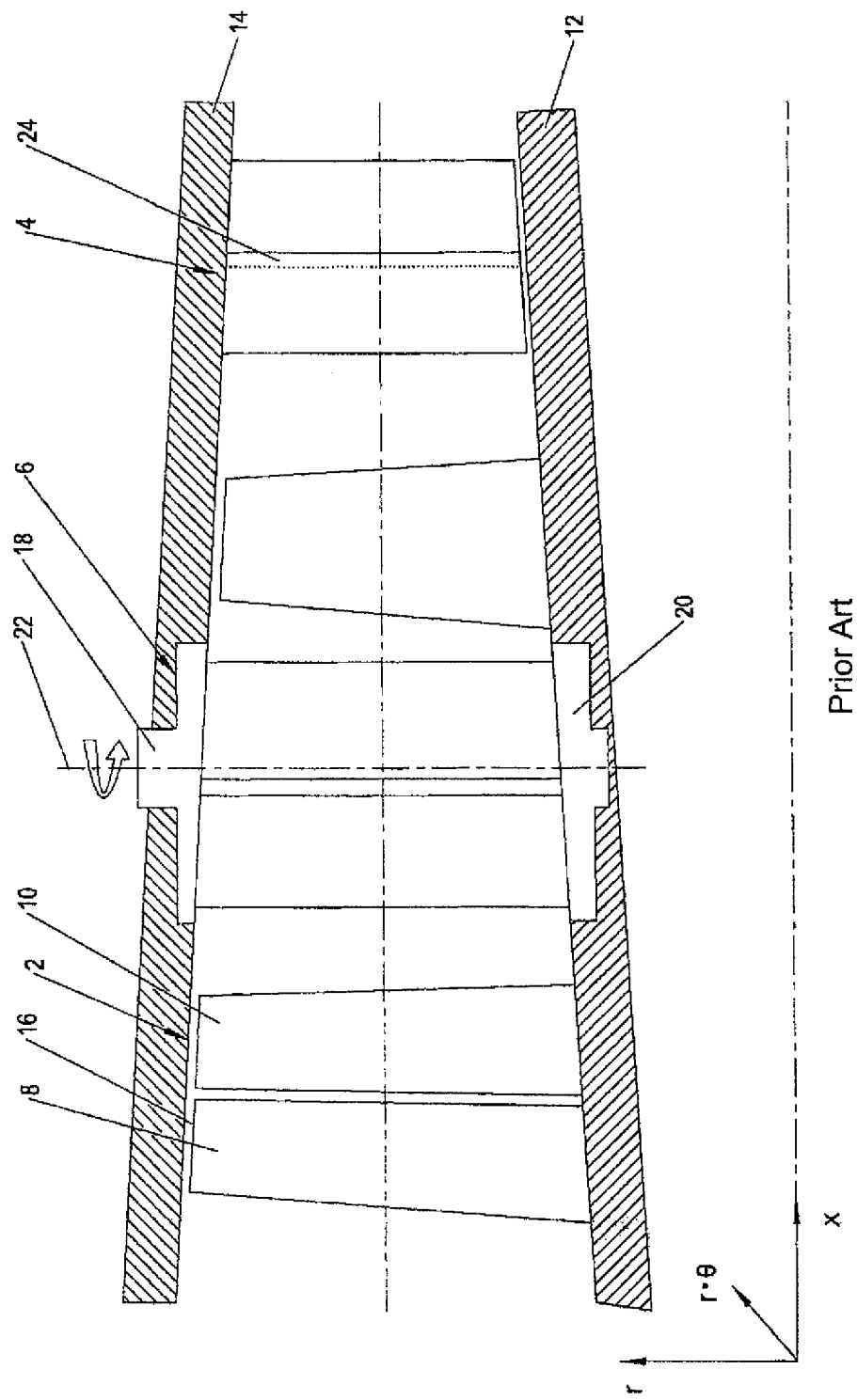

The maximum deflection of a row of blades of a turbomachine and thus its aerodynamic load capacity are limited, for one thing, by a separation of the flow along the blade profile. For another thing, the maximum deflection is limited by a separation of a boundary-layer flow on the side walls on the hub side and on the housing side. Double-row and multiple-row blade groups are known for purposes of increasing the deflection capacity of rows of blades. Examples of double-row blade groups are shown in FIG. 1. Other double-row blade groups are described by way of an example in German patent application DE 10 2009 013 399 A1 as well as in European patent specification EP 0 823 540B1.

The blade-row groups shown in FIG. 1 are a blade-row group 2 on the rotor side, a blade-row group 4 on the stator side, and a variable blade-row group 6. The blade-row groups 2, 4, 6 are each formed by a plurality of blade group arrangements that are configured as familiar tandem blade arrangements, each having two blades 8, 10 arranged one after the other in the flow direction. The front blades 8 and the rear blades 10 each form a blade row.

The blade-row group 2 on the rotor side and the blade-row group 4 on the stator side are each firmly joined to a hub 12 or to a housing 14, whereby a tight clearance 16 is formed between the tips of the blades 8, 10 and the housing 14 or the hub 12. The blades 8, 10 of the variable blade-row group 6 are each mounted at their ends on a rotary disk 18, 20 and can be pivoted around a transversal axis 22 as depicted by the arrow indicating the rotation. The blades 8, 10 can be at a distance from each other in the axial direction (blade-row group 2 on the rotor side and variable blade-row group 6) or else can form an overlapping area 24 (blade-row group 4 on the stator side).

SUMMARY OF THE INVENTION

It is an object of the present invention to provide a blade group arrangement for a turbomachine in order to form a blade-row group that allows a high efficiency. It is also an objective of the invention to provide a turbomachine having a high efficiency.

The present invention provides a blade group arrangement for a turbomachine that forms a blade-row group has a front blade and a rear blade that are arranged offset from each other in the axial and circumferential directions, and an overlapping area that runs between the pressure side of the front blade and between the suction side of the rear blade. According to the invention, in the overlapping area, the blades converge with a contraction ratio≥1.2 between an inlet surface and an outlet surface.

It has been recognized that a very low loss rate and an especially stable deflection behavior can be achieved with a certain contraction ratio in case of convergence. The implementation of the contraction ratio according to the invention makes it possible to obtain blade group arrangements having optimized flow mechanics such as tandem blade arrangements, and especially also blade-row groups having an efficiency that is high or that is improved in comparison to prior-art blade group arrangements. The contraction ratio, however, is not limited to tandem blade arrangements, but rather, can also be employed for blade group arrangements with more than two blades that are arranged offset from each other in the axial and circumferential directions.

However, it has been found that a maximum contraction ratio must not be exceeded if a high efficiency is to be achieved. In one embodiment, the maximum contraction ratio amounts to 2.8, so that the contraction ratio ranges from 1.2 to 2.8.

In a particularly preferred embodiment, the contraction ratio has a value of 1.7.

Moreover, in order to improve the efficiency, it is advantageous for the suction side of the rear blade to have a greater curvature downstream from the outlet surface than upstream from the outlet surface.

Preferably, the curvature has a maximum that ranges from 1.6 to 1.7 times the mean curvature of the suction side of the rear blade.

In a preferred embodiment, the curvature maximum amounts to approximately 5% to 25% of the relative skeleton line length behind the outlet surface of the overlapping area.

A preferred turbomachine has at least one blade-row group having a plurality of blade group arrangements according to the invention. Such a turbomachine is characterized by a high efficiency and thus also a high effectiveness.

DETAILED DESCRIPTION

Figure 2:
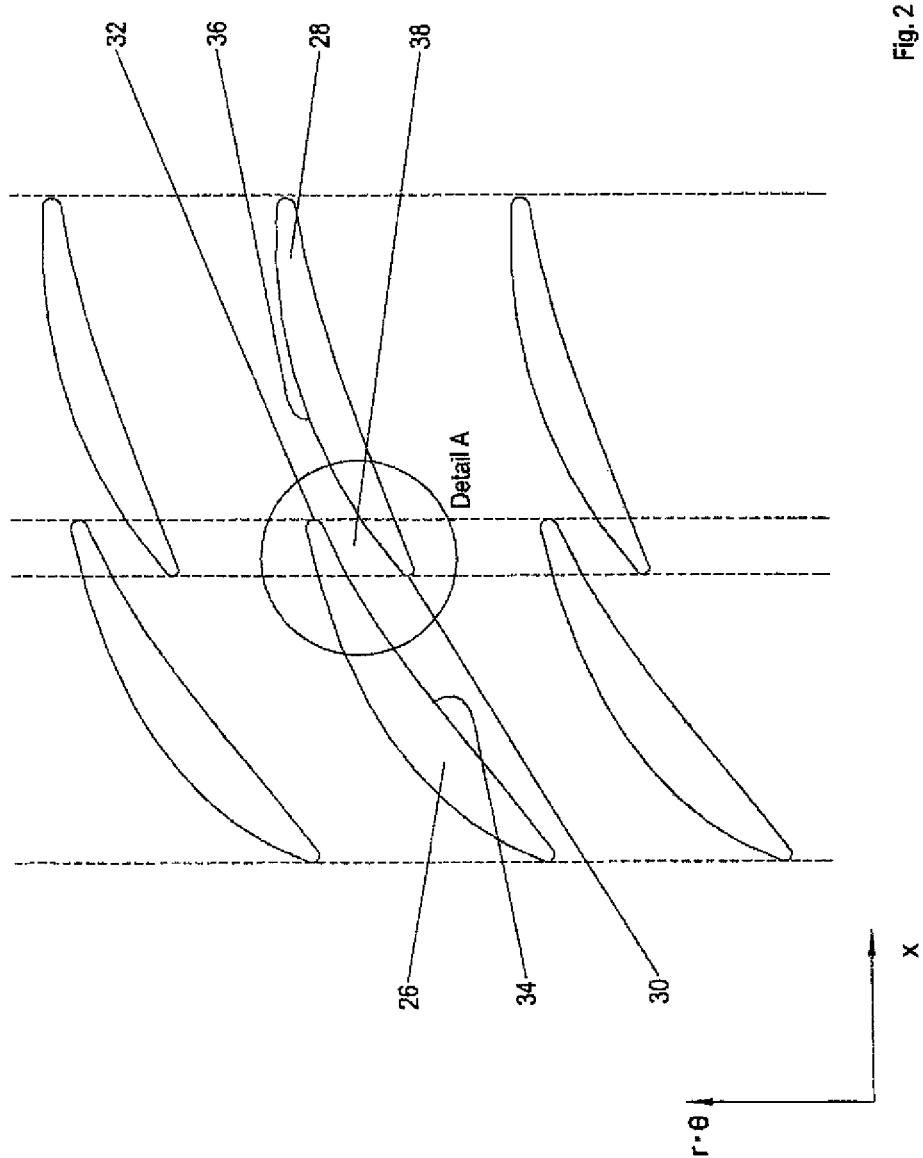
Figure 3:
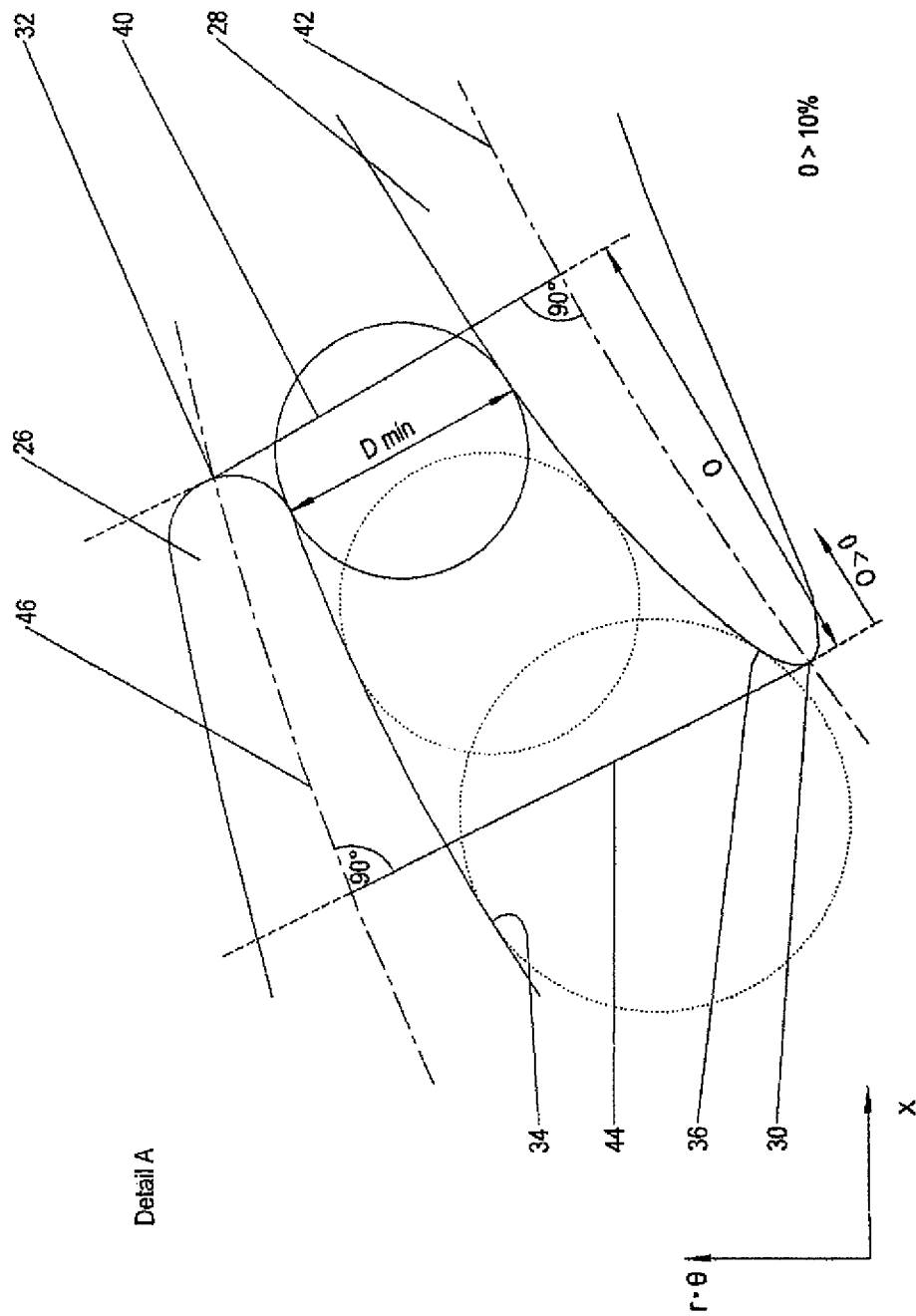
Figure 4:
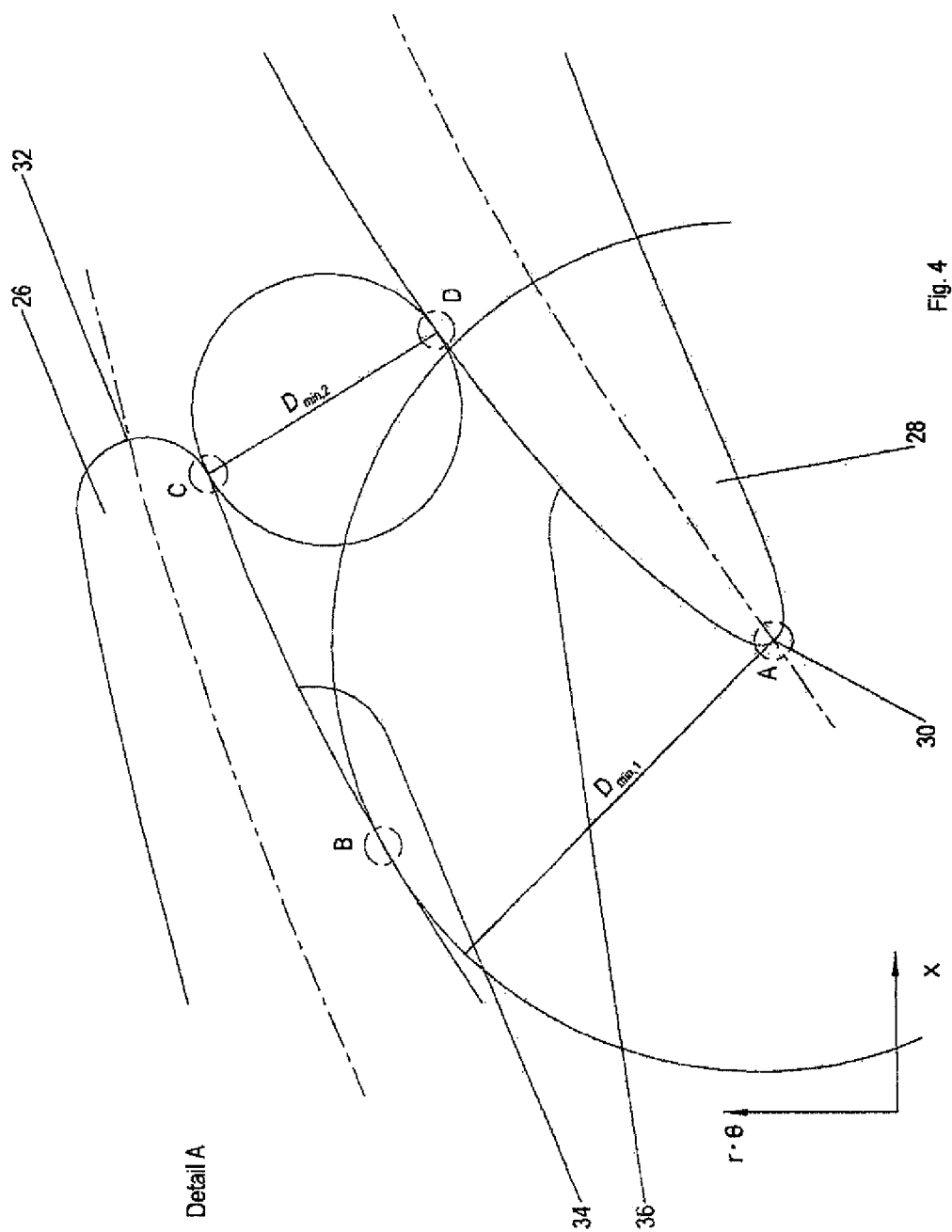
Figure 5:
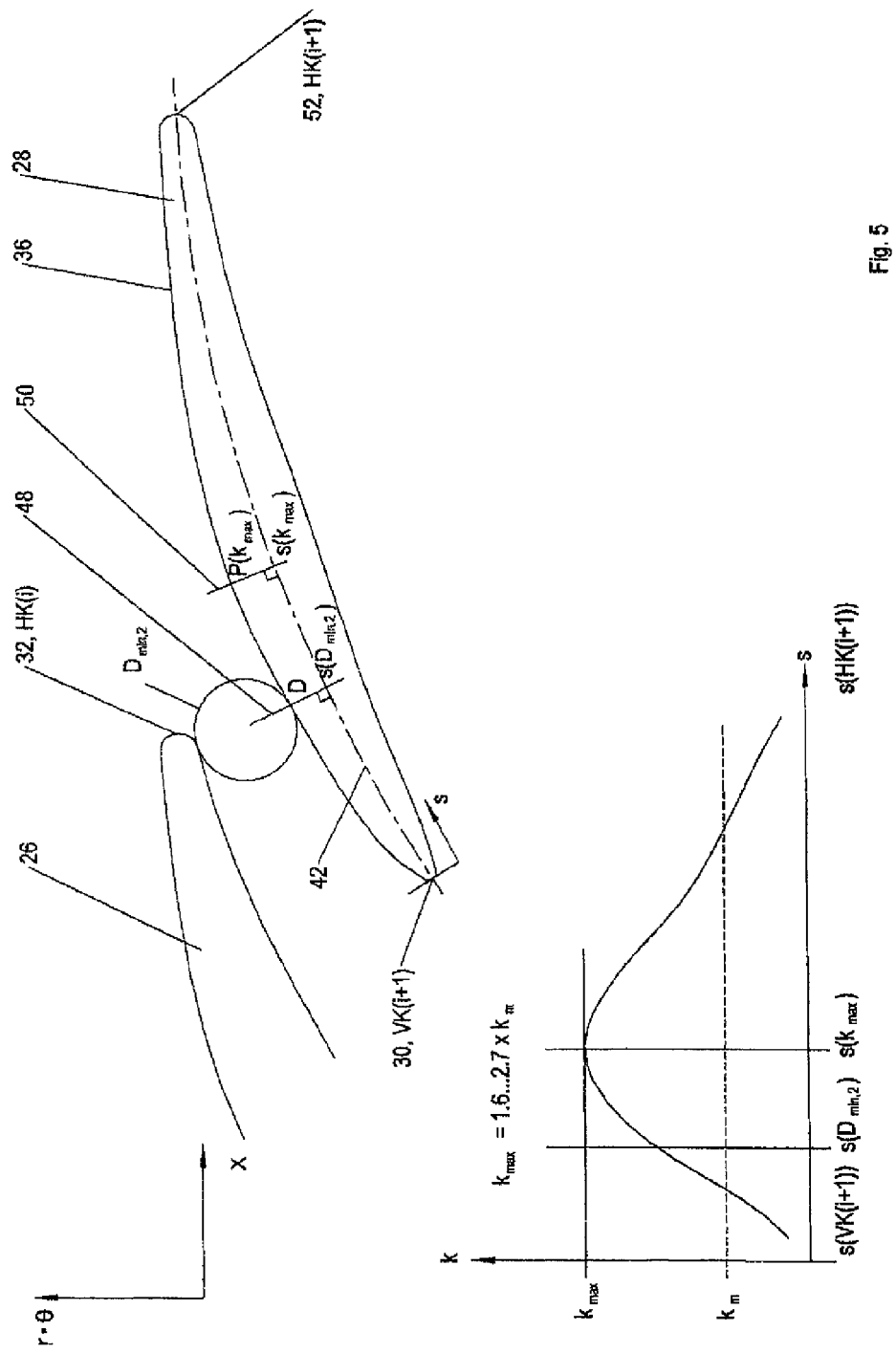

Preferred embodiments of the invention will be explained in greater detail below on the basis of schematic depictions. The following is shown:

FIG. 1 prior-art blade-row groups of a turbomachine by way of an example,

FIG. 2 a top view of an axial plane of a blade-row group on the compressor side, having a plurality of blade group arrangements according to the invention, FIG. 3 a detailed view of an overlapping area, with a sketched cross-sectional surface, FIG. 4 a detailed view of an overlapping area, with a sketched inlet surface and outlet surface, and FIG. 5 an inventive curvature configuration of a rear blade of a tandem blade arrangement.

DETAILED DESCRIPTION

FIG. 2 shows a top view of a circumferential section of a blade-row group of a turbomachine, for instance, a stationary gas turbine or an aircraft engine. The blade-row group is made up of a plurality of blade group arrangements such as tandem blade arrangements, each of which has two blades 26 and 28 arranged offset from each other in the axial and circumferential directions. The blades 26 and 28 each form a row of blades and each have a leading edge 30 extending in the radial direction and a trailing edge 32 extending in the radial direction. Preferably, the front blades 26 are arranged with their trailing edges 32 downstream from the leading edges 30 of the rear blades 28, as a result of which an overlapping area 38 is formed between the pressure sides 34 of the front blades 28 and the suction sides 36 of the rear blades 28.

As can be seen in the detailed view A in FIG. 3, the overlapping area 38 has a degree of overlap O that is ascertained by lowering a plumb line 40 from the trailing edge 32 of the front blade 36 onto a skeleton line 42 of the rear blade 28. The distance between the leading edge 30 and the point of intersection between the plumb line 40 and the skeleton line 42 of the rear blade 28 is the degree of overlap O. In this context, the degree of overlap O is ascertained to be positive from the leading edge 30 in the direction of the rear blade 28. Fundamentally speaking, each overlapping area has a degree of overlap O on the pressure side and on the suction side, which are each ascertained separately for the pressure side 34 and for the suction side 36. The degree of overlap on the pressure side (not true-to-scale) is ascertained by lowering a plumb line 44 from the leading edge 30 of the rear blade 28 onto a skeleton line 46 of the front blade 26. The distance between the trailing edge 32 of the front blade 26 and the point of intersection between the plumb line 44 and the skeleton line 46 is the degree of overlap on the suction side.

The overlapping area 38 has a convergent surface configuration, that is to say, the pressure side 34 and the suction side 36 taper nozzle-like towards each other in the flow direction. Since this is being considered two-dimensionally, the cross-sectional surface $D_{min}$ is always to be understood as the blade distance multiplied by the radial unit height.

As sketched in FIG. 4, the overlapping area 38 has an inlet surface $D_{min,1}$, which is defined as the smallest distance (segment A-B) between the leading edges 30 of the rear blades 28 and the pressure sides 34 of the front blades 26. Moreover, the overlapping area 38 has a smaller outlet surface or narrow surface $D_{min,2}$, which is described by the smallest distance (segment C-D) between the suction sides 36 of the rear blades 28 and the pressure sides 34 of the front blades 26.

Between these two surfaces or distances $D_{min,1}$, $D_{min,2}$, a contraction ratio KV is defined for which the following applies according to the invention: $KV = D_{min,1}/D_{min,2}$, wherein $1.2 \leq KV \leq 2.8$. Preference is given to a contraction ratio $KV=1.7$ FIG. 5 shows a preferred profile curvature of the rear blades 28 on the suction side. As shown in the lower left-hand side of the diagram, each blade surface has a curvature configuration that is plotted as the curvature k over, for example, the running coordinate s along the skeleton line 42. In this context, primarily only the profile curvature of the rear blades 28 on the suction side amounting to between 2% and 98% is being taken into consideration. A mean curvature $k_m$ can be ascertained for the suction side 36 of the rear blades 28. The curvature configuration on the suction side of the downstream blades 28 has a maximum $k_{max}$ which, according to the invention, fulfills the following condition: $1.6 \times k_m \leq k_{max} \leq 2.7 \times k_m$. Preferably, the following applies:

$$k_{max} = 2.5 \times k_m.$$

As illustrated in the top right-hand side in FIG. 5, the position of the curvature maximum $k_{max}$ is described as follows: by lowering a plumb line 48 from the point D on the suction side 36 of the rear blade 28 onto its skeleton line 42, the distance of the outlet surface $s(D_{min,2})$ from the leading edge 30 of the rear blade 28 along the skeleton line 42 is ascertained. In the same manner, by lowering a plumb line 50 from the point D of the maximum curvature $P(k_{max})$ onto the skeleton line 42, the distance of the maximum suction side curvature $s(k_{max})$ from the leading edge 30 along the skeleton line 42 is ascertained. As set forth in the invention, the following applies for the distance of the maximum suction-side curvature $s(k_{max})$:

$$s(D_{min,2})+0.05 \times (s(HK(i+1))-s(VK(i+1))) \leq s(k_{max}) \leq s(D_{min,2})+0.25 \times (s(HK(i+1))-s(VK(i+1))),$$

wherein $HK(i+1)$ is the trailing edge 52 of the rear blade 28 of a blade row i+1, and $VK(i+1)$ is the leading edge 30 of the front blade 28 of a blade row i+1.

As a result, the curvature maximum is approximately 5% to 25% of the relative skeleton line length behind the narrow surface $D_{min,2}$.

The condition above according to $s(k_{max})$ yields the following relationship:

$$s(k_{max})=s(D_{min,2})+0.05 \ldots 0.25 \times (s(HK(i+1))-s(VK(i+1))) \text{ or}$$

$$s(k_{max})=s(D_{min,2})+0.05 \ldots 0.25 \times (s(52)-s(30)).$$

Preferably, the following applies:

$$s(k_{max})=s(D_{min,2})+0.15 \times (s(HK(i+1))-s(VK(i=1))).$$

This document discloses a blade group arrangement for a turbomachine in order to form a blade-row group, whereby each front blade, together with a rear blade, forms an overlapping area that has a contraction ratio of at least 1.2, as well as a turbomachine having such a contraction ratio between a front blade and a rear blade.

LIST OF REFERENCE NUMERALS 2 blade-row group on the rotor side
4 blade-row group on the stator side
6 variable blade-row group
8 front blade
10 rear blade
12 hub
14 housing
16 tight clearance
18 rotary disk
20 rotary disk
22 transversal axis
24 overlapping area
26 front blade
28 rear blade
30 leading edge
32 trailing edge
34 pressure side
36 suction side
38 overlapping area
40 plumb line
42 skeleton line of the rear blade
44 plumb line
46 skeleton line of the front blade
48 plumb line
50 plumb line
52 trailing edge
$D_{min}$ narrow surface
$D_{min,1}$ outlet surface
$D_{min,2}$ inlet surface
i blade row
HK trailing edge
k curvature
$k_m$ mean curvature
$k_{max}$ curvature maximum
VK contraction ratio
VK leading edge

What is claimed is:
1. A blade group arrangement for a turbomachine in order to form a blade-row group, comprising:

a front blade and a rear blade arranged offset from each other in the axial and circumferential directions and forming an overlapping area running between a pressure side of the front blade and a suction side of the rear blade, the front and rear blades in the overlapping area converging with a contraction ratio KV of KV≥1.2 between an inlet surface $D_{min,1}$ defined as a smallest distance between a leading edge of the rear blade and the pressure side of the front blade, and an outlet surface $D_{min,2}$ defined as a further smallest distance between the suction side of the rear blade and the pressure side of the front blade.

2. The blade group arrangement as recited in claim 1 wherein the contraction ratio KV is ≤2.8.

3. The blade group arrangement as recited in claim 1 wherein the contraction ratio KV=1.7.

4. The blade group arrangement as recited in claim 1 wherein the suction side of the rear blade has a greater curvature downstream from the outlet surface $D_{min,2}$ than upstream from the outlet surface $D_{min,2}$.

5. The blade group arrangement as recited in claim 4 wherein the curvature has a maximum ranging from 1.6 to 1.7 times a mean curvature of the suction side of the rear blade.

6. The blade group arrangement as recited in claim 5 wherein the curvature maximum amounts to approximately 5% to 25% of a relative skeleton line length behind the outlet surface $D_{min,2}$.

7. A turbomachine comprising at least one blade-row group having a plurality of blade group arrangements as recited in claim 1.

* * * * *